US010317254B2

(12) United States Patent
Geiger et al.

(10) Patent No.: US 10,317,254 B2
(45) Date of Patent: Jun. 11, 2019

(54) OPTICAL ENCODER SYSTEM

(71) Applicant: ams Sensors Singapore Pte. Ltd., Singapore (SG)

(72) Inventors: Jens Geiger, Thalwil (CH); Nicola Spring, Ziegelbrücke (CH); Robert Lenart, Zurich (CH); Bassam Hallal, Thalwil (CH); Hakan Karpuz, Au (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 2 days.

(21) Appl. No.: 15/127,660

(22) PCT Filed: Mar. 18, 2015

(86) PCT No.: PCT/SG2015/050041
§ 371 (c)(1),
(2) Date: Sep. 20, 2016

(87) PCT Pub. No.: WO2015/147756
PCT Pub. Date: Oct. 1, 2015

(65) Prior Publication Data
US 2018/0172483 A1    Jun. 21, 2018

Related U.S. Application Data

(60) Provisional application No. 61/971,086, filed on Mar. 27, 2014.

(51) Int. Cl.
*G01D 5/347* (2006.01)
*G01D 5/34* (2006.01)

(52) U.S. Cl.
CPC .......... *G01D 5/3473* (2013.01); *G01D 5/342* (2013.01); *G01D 5/34707* (2013.01); *G01D 5/34715* (2013.01)

(58) Field of Classification Search
CPC ...... G01D 5/34; G01D 5/347; G01D 5/34707; G01D 5/3473; G01D 5/26; G01D 5/34715
See application file for complete search history.

(56) References Cited

U.S. PATENT DOCUMENTS 3,521,961 A * 7/1970 Heidenhain ............ G01B 11/00
356/618
4,644,156 A * 2/1987 Takahashi .......... G01D 5/34707
216/24

(Continued)

FOREIGN PATENT DOCUMENTS

WO   2015/053707   4/2015
WO   2015/053708   4/2015

OTHER PUBLICATIONS

Australian Patent Office (ISA/AU), International Search Report and Written Opinion issued for PCT/US2015/050041 (dated Jul. 2, 2015).

*Primary Examiner* — John R Lee
(74) *Attorney, Agent, or Firm* — Fish & Richardson P.C.

(57) ABSTRACT

Optical encoding systems include a generalized cylindrical code scale having one or more regions with different light reflective properties. In an example process, a code scale can be created by coating an elongated generalized cylinder with one or more different layers of materials having different light reflective properties. Portions of these layers can be removed selectively in order to expose a particular overlying material and create a particular pattern of features having different optical characteristics (e.g., absorbing, specularly reflecting, diffusely reflecting).

15 Claims, 12 Drawing Sheets

(56) References Cited

U.S. PATENT DOCUMENTS

| | | |
|---|---|---|
| 4,866,269 A | 9/1989 | Wlodarczyk et al. |
| 4,952,799 A | 8/1990 | Loewen |
| 5,880,882 A * | 3/1999 | Michel ............... G01D 5/34707 250/237 G |
| 6,914,234 B2 * | 7/2005 | Yasuda ............... G01D 5/34715 250/225 |
| 7,256,938 B2 * | 8/2007 | Barton ................ G02B 5/1857 359/566 |
| 7,265,336 B2 | 9/2007 | Hataguchi et al. |
| 7,482,575 B2 | 1/2009 | Sidor et al. |
| 7,595,480 B2 | 9/2009 | Kress |
| 7,619,209 B2 * | 11/2009 | Wong ................. G01D 5/34792 250/231.18 |
| 2001/0021485 A1 * | 9/2001 | Flatscher ........... G01D 5/34707 430/320 |
| 2004/0200957 A1 * | 10/2004 | Teng ................... G01D 5/34707 250/231.13 |
| 2005/0040323 A1 * | 2/2005 | Chong ............... G01D 5/34707 250/231.13 |
| 2005/0116153 A1 * | 6/2005 | Hataguchi .......... G01D 5/34707 250/231.13 |
| 2005/0207013 A1 * | 9/2005 | Kanno ............... G01D 5/34707 359/576 |
| 2006/0002748 A1 * | 1/2006 | Kudo ................. G03G 15/5058 399/302 |
| 2008/0087805 A1 * | 4/2008 | Kress ................... G01D 5/3473 250/231.13 |
| 2008/0100849 A1 * | 5/2008 | Chang ................ G01D 5/3473 356/521 |
| 2009/0152452 A1 * | 6/2009 | Lee ......................... G01D 5/04 250/231.15 |
| 2009/0267803 A1 * | 10/2009 | Tominaga .......... G01D 5/34707 341/13 |
| 2009/0316155 A1 * | 12/2009 | Yaku .................. G01D 5/34707 356/445 |
| 2011/0139971 A1 | 6/2011 | Phillips |
| 2013/0070359 A1 * | 3/2013 | Oshida .................... C23C 18/54 359/884 |
| 2013/0112860 A1 * | 5/2013 | Mizuno ............. G01D 5/34707 250/231.1 |
| 2014/0042308 A1 * | 2/2014 | Takada ................ G01D 5/3473 250/231.14 |
| 2014/0151540 A1 * | 6/2014 | Holzapfel ................ G01D 5/38 250/231.13 |
| 2014/0367560 A1 * | 12/2014 | Maeda ............... G01D 5/34746 250/231.1 |
| 2015/0108353 A1 * | 4/2015 | Geiger ............... G01D 5/34707 250/341.8 |
| 2015/0234279 A1 * | 8/2015 | Fujiwara .................. G03F 7/20 438/763 |

\* cited by examiner

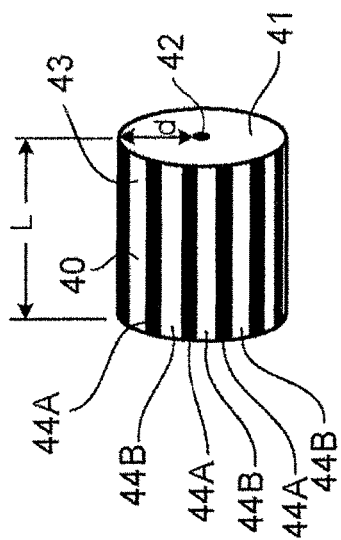
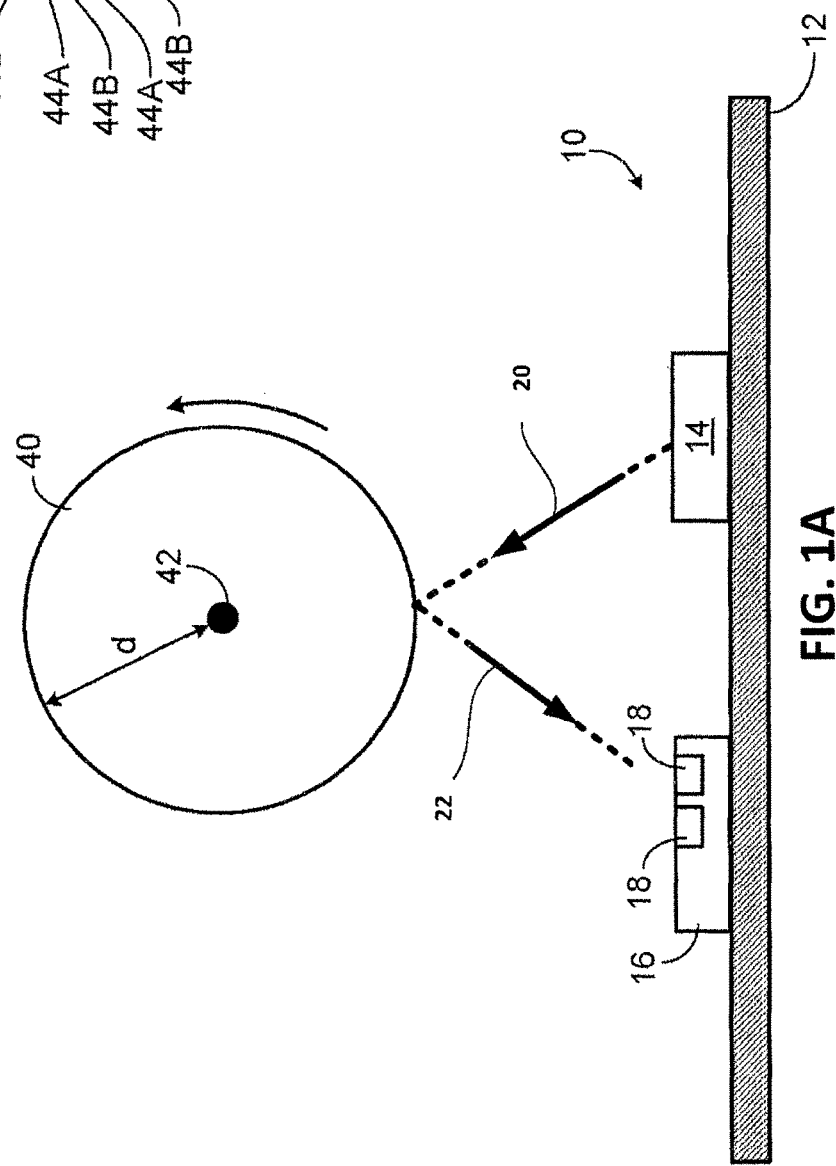
FIG. 1B
FIG. 1A

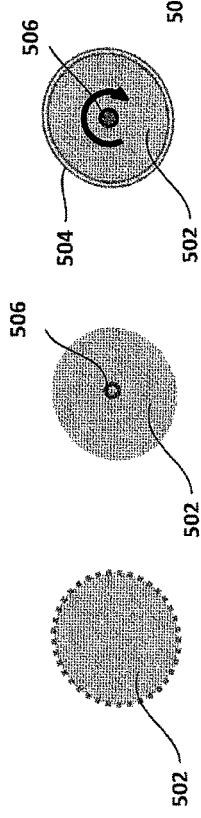
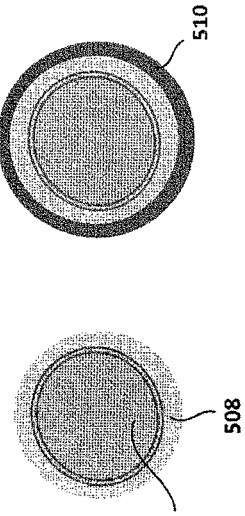
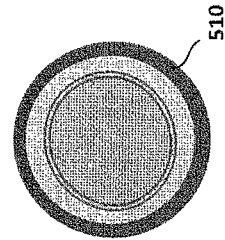
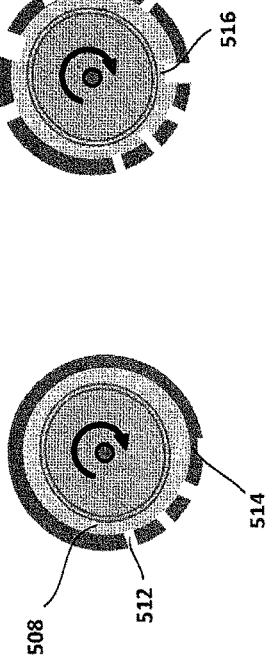
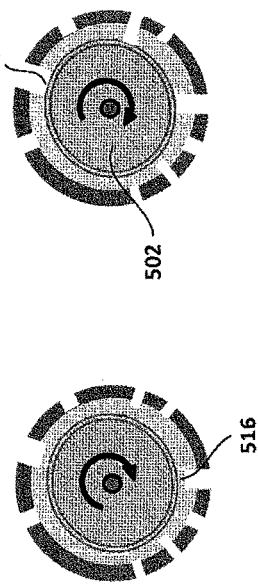
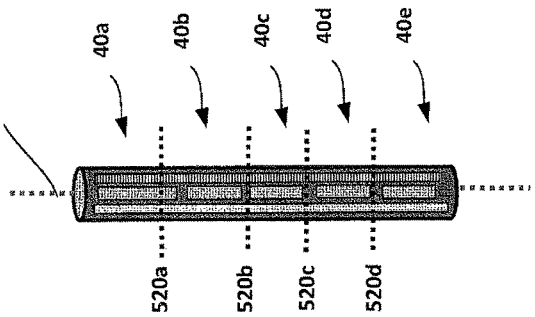
FIG. 5A
FIG. 5B
FIG. 5C
FIG. 5D
FIG. 5E
FIG. 5F
FIG. 5G
FIG. 5H
FIG. 5I

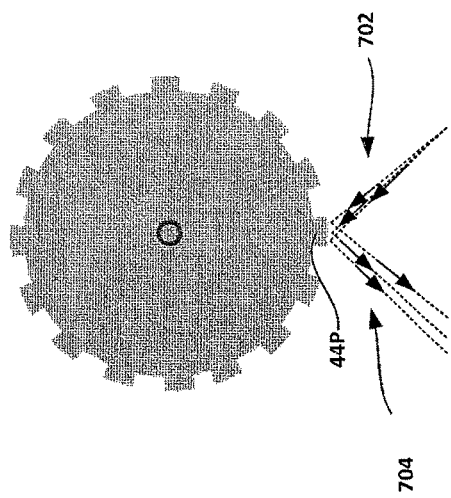
FIG. 7C
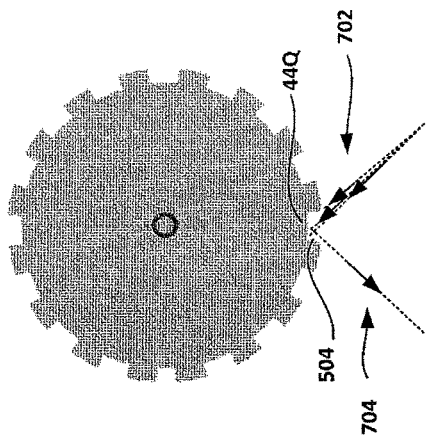
FIG. 7D
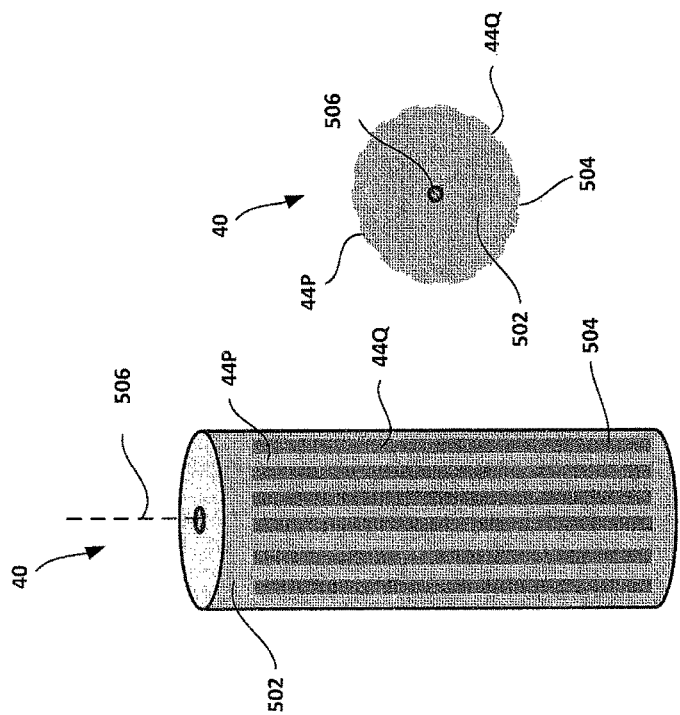
FIG. 7B
FIG. 7A

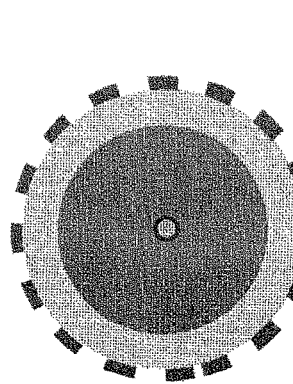
FIG. 8C
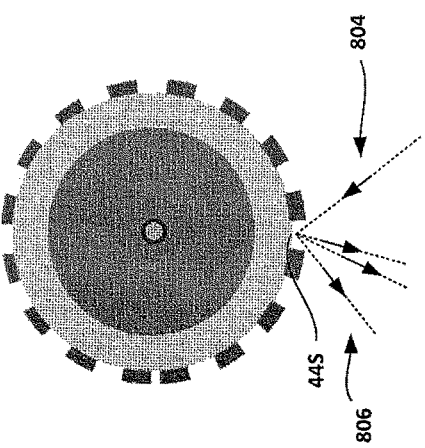
FIG. 8D
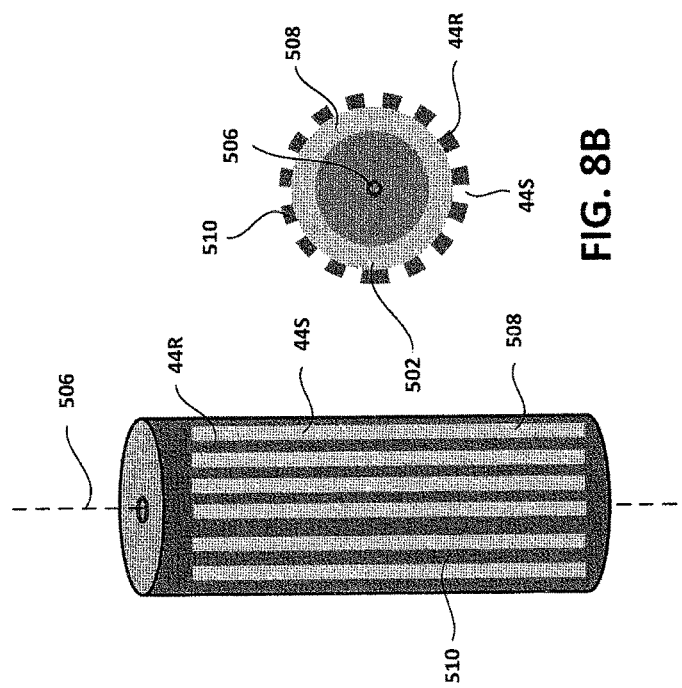
FIG. 8B
FIG. 8A

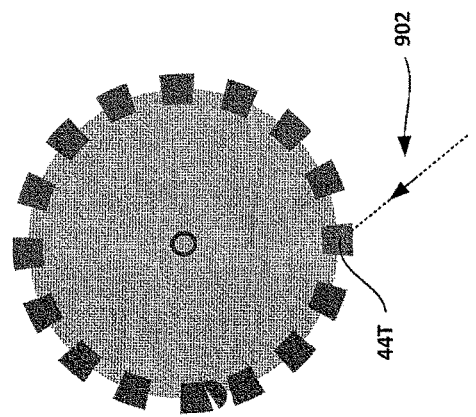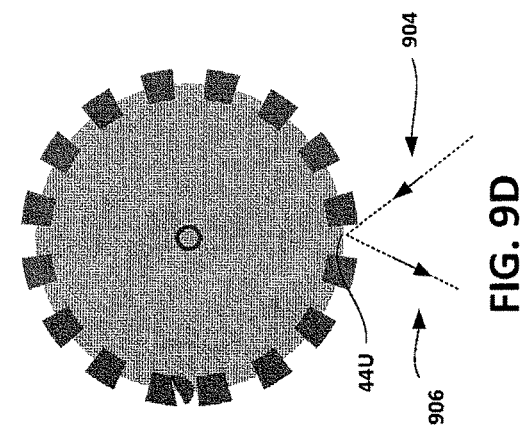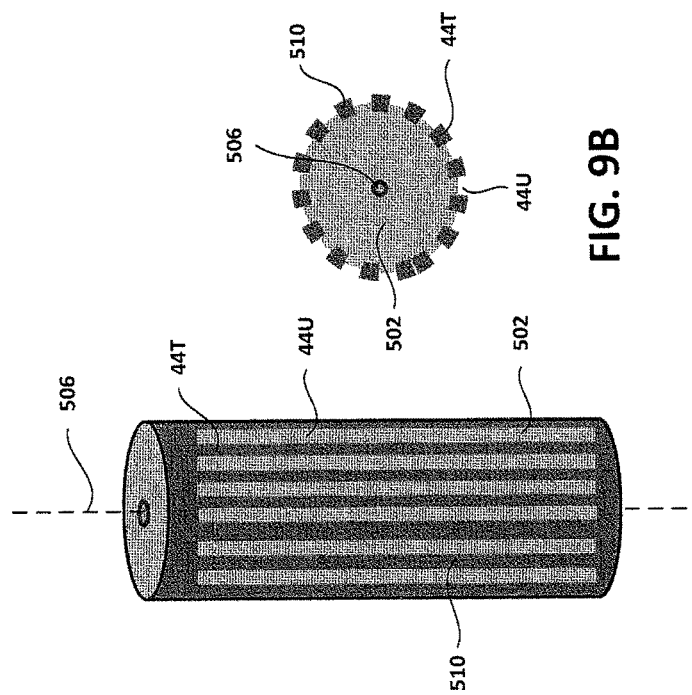

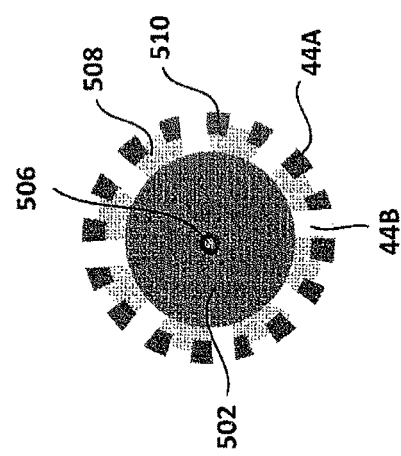
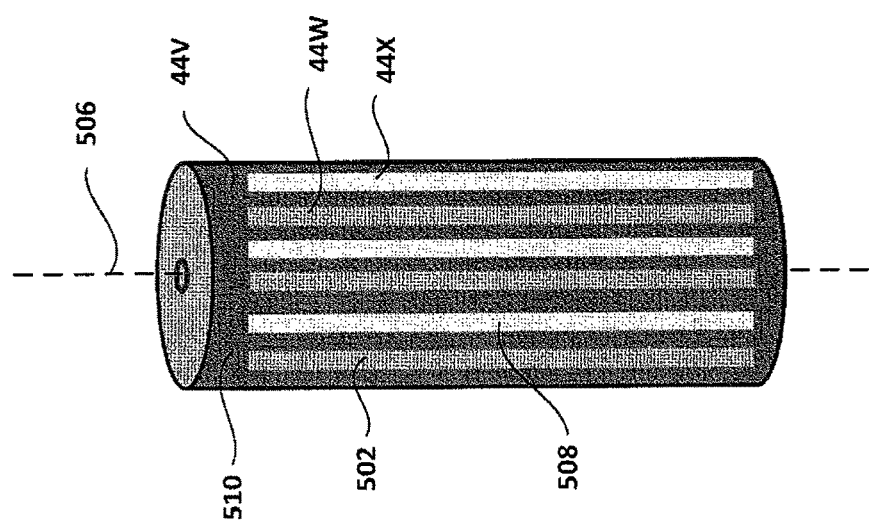
FIG. 10B
FIG. 10A

OPTICAL ENCODER SYSTEM

TECHNICAL FIELD

This disclosure relates to optical encoder systems.

BACKGROUND

Optical encoders can be used to detect motion, for example, of a rotating code scale (e.g., a cylindrical code wheel) that includes a pattern of stripes to reflect light in a known pattern. Motion of the code scale can be detected optically using a light emitter and a light detector. As the code scale rotates, the intensity and direction of light reflected by the code scale varies. In particular, light is reflected by the pattern on the code scale such that a corresponding pattern of light can be detected by the detector. The detected pattern can be converted, for example by a signal processor, into a digital signal that is indicative of the movement, position, direction, or speed of the code scale.

SUMMARY

In general, this disclosure relates to optical encoding systems. For example, in one aspect, a method of manufacturing a code scale for an optical encoder system includes providing a generalized cylinder having a first feature with a first light reflective characteristic, and providing on the generalized cylinder a second feature having a second light reflective characteristic different from the first light reflective characteristic.

Implementations of this aspect may include one or more of the following features.

For example, in some implementations, the method can further include providing on the generalized cylinder a third feature having a third light characteristic different from the first and second light reflective characteristics. The method can further include providing on the generalized cylinder a fourth feature having a fourth light characteristic different from the first, second, and third reflective characteristics.

In some implementations, the first and second reflective characteristics can each correspond to different specularly reflective characteristics. At least one of the first and second reflective characteristics can correspond to an anisotropic reflective characteristic. One of the first and second reflective characteristics can correspond to a diffusely reflective characteristic. Each of at least two of the first, second, and third reflective characteristics can correspond to a different respective specularly reflective characteristic. At least one of the first, second, and third reflective characteristics can correspond to an anisotropic reflective characteristic. At least one of the first, second, and third reflective characteristics can correspond to a diffusely reflective characteristic. At least one of the first, second, and third reflective characteristics can correspond to a light absorbing characteristic.

In some implementations, providing the second feature can include applying a first layer of a first material to the generalized cylinder, and removing portions of the first layer according to a pre-determined pattern. In some implementations, removing portions of the first layer can reveal portions of the generalized cylinder.

In some implementations, providing the second and third features can include applying a first layer of a first material to the generalized cylinder, applying a second layer of a second material to the first layer, and removing portions of the first layer and portions of the second layer according to a pre-determined pattern. In some implementations, removing portions of the second layer can reveal portions of the first layer. Removing portions of the first layer and portions of the second layer can reveal portions of the first feature.

In some implementations, at least one of providing the first feature or providing the second feature can include altering surface characteristics of the generalized cylinder. Altering surface characteristics of the generalized cylinder can include polishing the surface of the generalized cylinder. In some implementations, the surface of the generalized cylinder can be specularly reflective or diffusely reflective after the polishing.

In some implementations, altering surface characteristics of the generalized cylinder can include creating one or more grooves on the surface of the generalized cylinder. The grooves can be adapted to reflect incident light of a particular incident angle or range of incident angles specularly or diffusely.

In some implementations, altering surface characteristics of the generalized cylinder can include creating two or more grooves on a surface of the generalized cylinder, where a first groove specularly reflects incident light differently from another groove.

In some implementations, altering surface characteristics of the generalized cylinder can include chemically treating a surface of the generalized cylinder.

In some implementations, the method can further include cutting the generalized cylinder into two or more cylindrical pieces.

In some implementations, the first layer can be adapted to diffusely or specularly reflect incident light of a specified incident angle or range of incident angles. In some cases, the second layer can be adapted to diffusely or specularly reflect incident light of a specified incident angle or range of incident angles.

In some implementations, the first layer can be applied to a surface of the generalized cylinder in a direction parallel or perpendicular to a longitudinal axis of the code scale. In some cases, the second layer can be applied to a surface of the generalized cylinder in a direction parallel or perpendicular to a longitudinal axis of the code scale.

In some implementations, the first feature and second feature can be disposed on a surface of the generalized cylinder in a direction parallel or perpendicular to a longitudinal axis of the code scale. In some cases, the third feature can be disposed on a surface of the generalized cylinder in a direction parallel or perpendicular to a longitudinal axis of the code scale. The fourth feature can be disposed on a surface of the generalized cylinder in a direction parallel or perpendicular to a longitudinal axis of the code scale.

In some implementations, the method can further include treating the generalized cylinder to promote adhesion between the first material and the generalized cylinder prior to applying the first layer. Treating the generalized cylinder to promote adhesion can include degreasing, roughening, or chemically treating the generalized cylinder.

In some implementations, providing the second feature can include changing light reflective characteristics of portions of the generalized cylinder by altering surface characteristics of the portions of the generalized cylinder according to a pre-determined pattern. Altering surface characteristics of the generalized cylinder can include creating one or more grooves on the surface of the generalized cylinder.

In some implementations, at least one of the first feature and the second feature can be partially diffusely or specularly reflective.

In some implementations, polishing the surface of the generalized cylinder can include directly polishing the surface of the generalized cylinder with respect of a polishing axis. In some cases, polishing the surface of the generalized cylinder can include randomly polishing the surface of the generalized cylinder.

In some implementations, each groove can have a substantially convex, concave, triangular, or rectangular cross-section. In some cases, the grooves can be positioned on the surface of the generalized cylinder according to a pre-determined pattern. In some implementations, the grooves can be randomly positioned on the surface of the generalized cylinder.

In some implementations, at least one of the first and second reflective characteristic can correspond to a light absorbing characteristic.

In another aspect, the disclosure describes a code scale for an optical encoder system including a generalized cylinder, and a first feature having a first light reflective characteristic, and a second feature having a second light reflective characteristic different from the first light reflective characteristic.

Implementations of this aspect may include one or more of the following features.

For example, in some implementations, the first feature can be disposed on the generalized cylinder, and the second feature can be disposed on the first feature.

In some implementations, the code scale can further include a third feature having a third light reflective characteristic different from the first and second light reflective characteristics. The first feature can be disposed on the generalized cylinder, the second feature can be disposed on the first feature, and the third feature can be disposed on the second feature.

In some implementations, the first and second reflective characteristics can each correspond to different specularly reflective characteristics. One of the first and second reflective characteristics can correspond to an anisotropic reflective characteristic. One of the first and second reflective characteristics can correspond to a diffusely reflective characteristic. Each of at least two of the first, second, and third reflective characteristics can correspond to a different respective specularly reflective characteristic. The at least two of the first, second, and third reflective characteristics can correspond to an anisotropic reflective characteristic. At least one of the first, second, and third reflective characteristics can correspond to a diffusely reflective characteristic. At least one of the first, second, and third reflective characteristics can correspond to a light absorbing characteristic. At least one of the first and second reflective characteristic can correspond to a light absorbing characteristic.

Other aspects, features and advantages will be apparent from the following description, the accompanying drawings, and the claims.

BRIEF DESCRIPTION OF THE DRAWINGS

FIG. 1A shows an example optical encoder system.
FIG. 1B shows an example code scale.
FIGS. 5A-I show an example process of making a code scale.
FIGS. 7A-D show an example code scale and its interaction with incident light.
FIGS. 8A-D shows another example code scale and its interaction with incident light.
FIGS. 9A-D shows another example code scale and its interaction with incident light.
FIGS. 10A-E shows another example code scale and its interaction with incident light.

DETAILED DESCRIPTION

Figure 2:
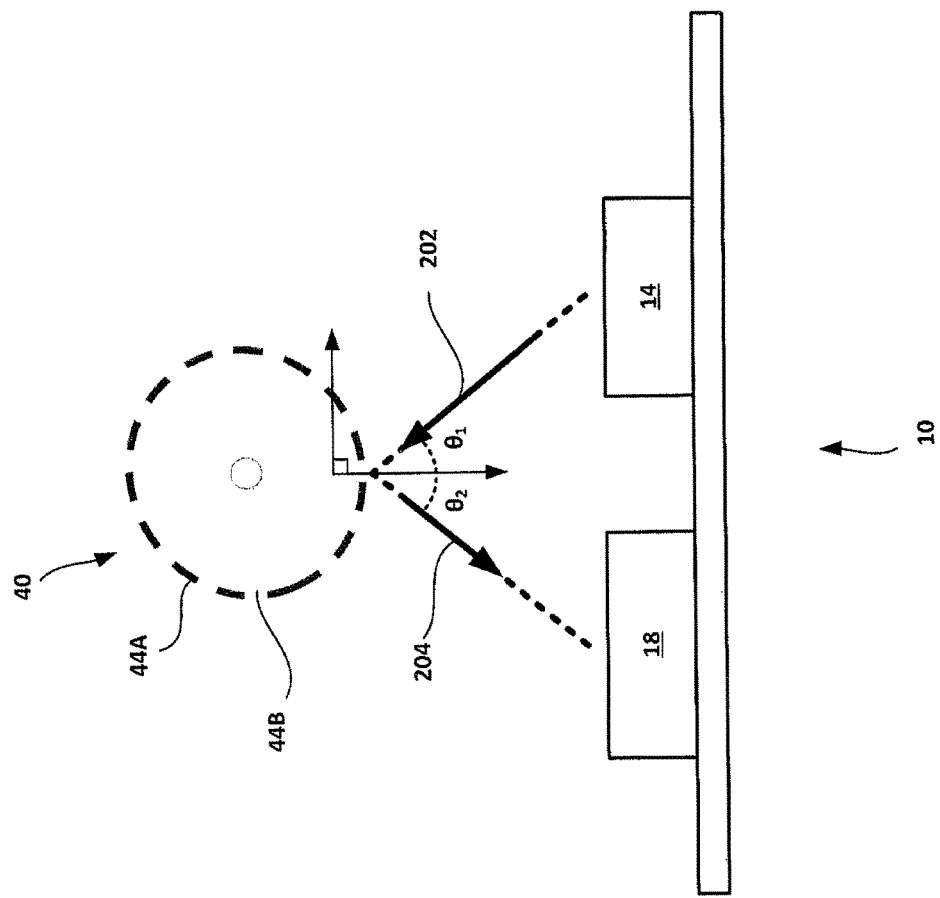
FIGS. 2-4 show various example code scales.

This disclosure describes an optical encoder system that includes an optical encoder module and a code scale, as well as methods for making code scale.

As illustrated in FIG. 1A, an optical encoder module 10 includes a substrate 12 on which are mounted a light emitting element chip 14 (e.g., a light emitting diode (LED), a laser diode or a VCSEL) and an integrated circuit chip 16 that has one or more (and in some cases two or more) light detecting elements 18 (e.g., photodiodes, or image sensors such as CMOS or CCD image sensors). The integrated circuit chip 16 includes circuitry for processing signals detected by the light detecting elements 18. In some implementations, one or more of these components (e.g., the integrated circuit chip 16) can be a part of a separate host device rather than a part of the optical encoder module 10.

In an example implementation, light emitting element chip 14 emits light (represented by arrow 20) towards code scale 40, and light detecting elements 18 detect light reflected from code scale 40 (represented by arrow 22). Based on the detected light, integrated circuit chip 16 determines information pertaining to a movement, position, direction, or speed of the code scale. As an example, integrated circuit chip 16 can determine the direction and velocity at which code scale 40 rotates about its longitudinal axis 42.

Although an example arrangement of components is shown in FIG. 1A, different arrangements are possible, depending on the implementation. As an example, code scale 40 can be oriented such that its longitudinal axis 42 extends parallel, perpendicular, or at some other orientation relative to a line extending from the light emitting element chip 14 to the integrated circuit chip 16. As another example, the distance between each of the components can vary, depending on the implementation.

The arrangement of the light detecting elements 18 also can vary, depending on the implementation. For example, two or more light detecting elements 18 may be arranged in an array. Providing two or more light detecting elements 18 allows the module to detect motion of a rotary code scale 40 (e.g., a code scale) disposed above the module 10 and to recognize relative angular positions changes over time. The dimensions of the light detecting elements 18 also can vary, depending on the implementation. For example, in some implementations, light detecting elements 18 can be relatively elongated in one or more dimensions relative to one or more other dimensions. The orientation of the light detecting elements 18 relative to the code scale 40 also can vary. For example, in some implementations, light detecting elements 18 can be oriented such that its direction of elongation extends parallel, perpendicular, or at some other orientation relative to the longitudinal axis 42 of code scale 40.

In some implementations, if the light emitting element 14 is a laser diode or VCSEL, diffuse reflection from the code scale 40 can produce a speckle pattern that is recorded by the image sensor. For some implementations using speckle pattern detection, only one image sensor may be needed to recognize the direction and speed of the code scale. The image sensor can record, for example, the direction and distance the image of the pattern moves over time. An advantage of using a speckle pattern detection technique is the extended depth of field (i.e., the image can be relatively "sharp" even if the position of the code scale moves significantly). In general, however, the light detecting elements 18 are not to only detecting diffusely reflected light. For example, in some implementations, the light detecting elements 18 can detect light that is specularly reflected from the code scale 40, either additionally or alternatively to detecting diffusely reflected light.

The light detecting elements 18 are arranged to detect a wavelength (or range of wavelengths) of light emitted by the light emitting element 14. In some implementations, light emitting element 14 emits infra-red light. In general, however, the wavelength(s) emitted by the light emitting element 14 can be in the visible or non-visible ranges.

As illustrated in FIG. 1B, the code scale 40 can be cylindrical-shaped with two substantially flat circular bases 41 and a circumferential surface 43. Code scale 40 can include one or more regions 44 that interact differently to light incident on code scale 40. As an example, code scale 40 can include a number of regions 44A and 44B in a pattern along circumferential surface 43. In this example, each region 44A and 44B extends along substantially the entire length (L) of the code scale. Although FIG. 1B shows a code scale 40 with two alternately repeating features (e.g., two alternately repeating regions 44A and 44B), a different number of different features or a different feature pattern may be appropriate for other implementations. For example, in some implementations, a code scale can have two features that do not alternate, but rather are positioned according to some other pattern. Further, each feature need not include only a single region. For example, in some implementations, each particular feature can include one or more different regions, and each region and feature can be positioned on the code scale 40 according to any particular pattern. In some implementations, each particular feature can include multiple regions having the same light reflective characteristics, or different light reflective characteristics, depending on the application.

Regions 44 can vary depending on the implementation. For example, as shown in FIG. 2, regions 44A and 44B can be arranged on code scale 40 to provide a particular specularly reflective pattern. FIG. 2 shows a simplified representation of an example code scale 40, having a pattern of repeating regions 44A and 44B, and encoder module 10, having a light emitting element 14 and a light detecting element 18. In this example, regions 44A are light absorbing regions, and regions 44B reflect light specularly. When light (represented by arrow 202) emitted by light emitting element 14 is incident upon specular reflecting region 44B at an angle of incidence $\theta_1$, it is reflected (represented by arrow 204) towards light detecting element 18 at an angle of reflection $\theta_2$. In specular reflection, the angle of incidence is equal to the angle of reflection (i.e., $\theta_1=\theta_2$). When light emitted by light emitting element 14 is incident upon light absorbing region 44A, the light is substantially absorbed.

Figure 3:
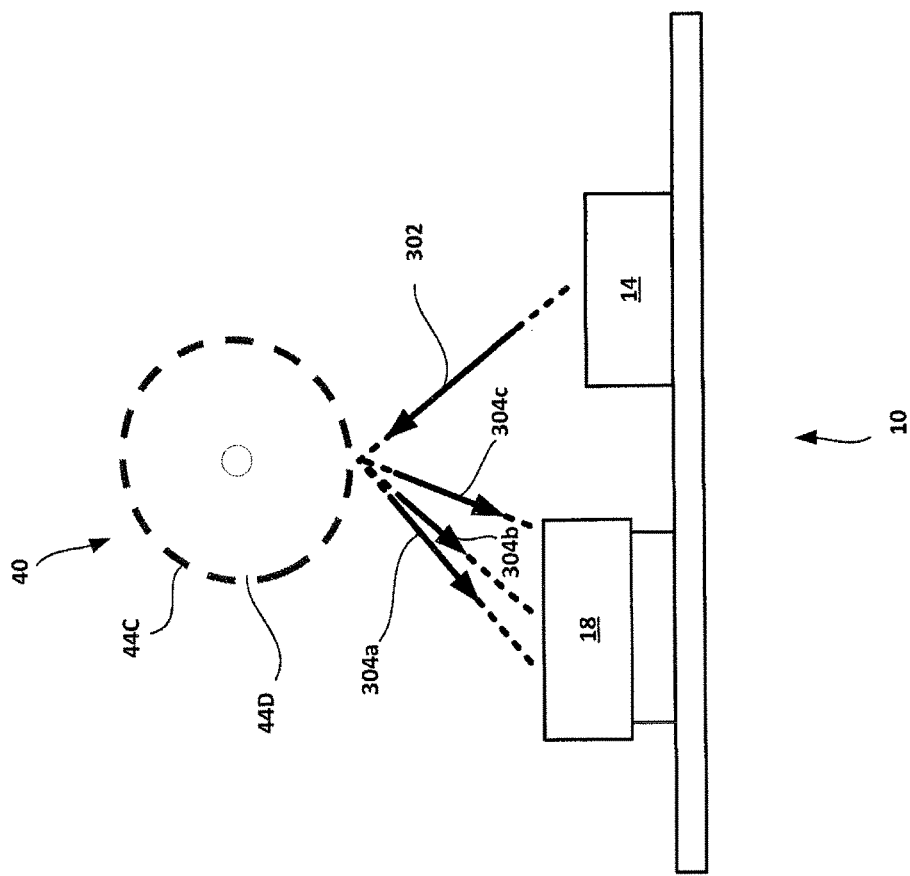

FIG. 3 shows a simplified representation of another example code scale 40, having a pattern of repeating regions 44C and 44D, and encoder module 10, having a light emitting element 14 and a light detecting element 18. In this example, regions 44C are light absorbing regions, and regions 44D reflect light diffusely. When light (represented by arrow 302) emitted by light emitting element 14 is incident upon diffuse reflecting region 44D, it is diffusely reflected (represented by arrows 304*a-c*) towards light detecting element 18. In this example, the angle or angles of reflected light is/are not substantially dependent on the angle of incident light. When light emitted by light emitting element 14 is incident upon light absorbing region 44C, the light is substantially absorbed. In this example, the distance between light detecting element 18 and code scale 40 is less than the distance between light emitting element 14 and code scale 40. Arranging the light detecting element 18 closer to the code scale 40 may be beneficial in certain implementations, as the diffusely reflected light may be more intense at points closer to the point of reflection on code scale 40. However, in some implementations, the distance between light detecting element 18 and code scale 40 can be equal to or greater than the distance between light emitting element 14 and code scale 40

Figure 4:
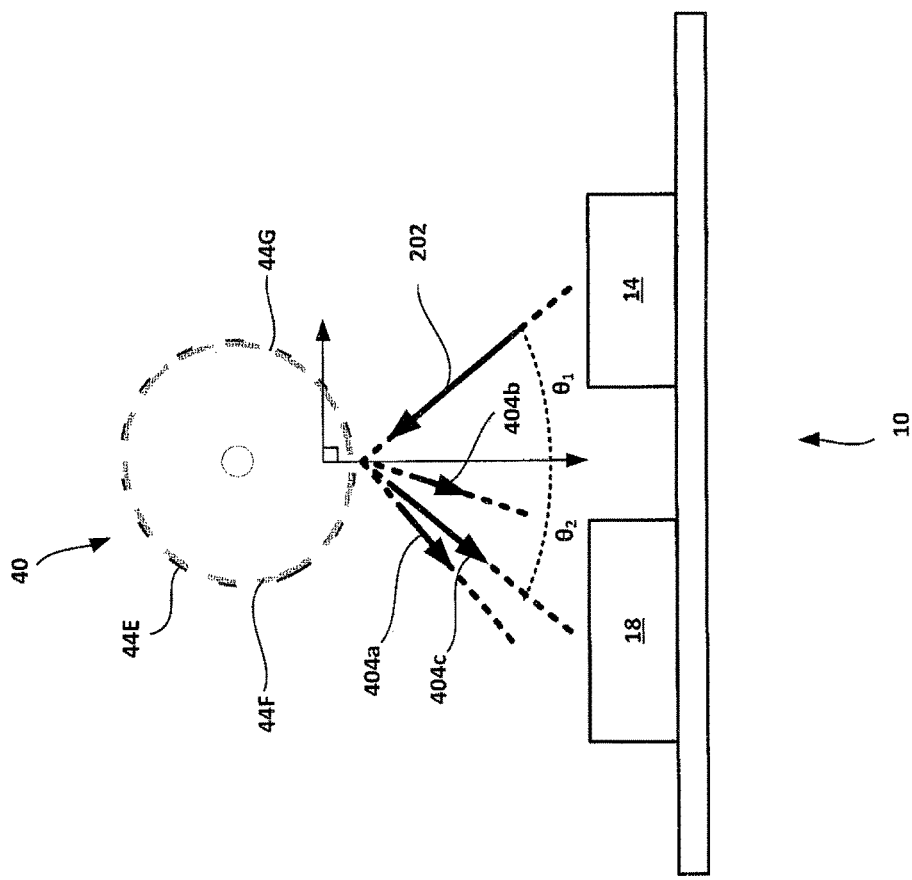

FIG. 4 shows a simplified representation of another example code scale 40, having a pattern of repeating regions 44E, 44F, and 44G, and encoder module 10, having a light emitting element 14 and a light detecting element 18. In this example, regions 44E are light absorbing regions, regions 44F reflect light diffusely, and regions 44G reflect light specularly. When light (represented by arrow 202) emitted by light emitting element 14 is incident upon diffuse reflecting region 44F, it is diffusely reflected (represented by arrows 404*a-b*) and detected by light detecting element 18. When the emitted light is incident upon specular reflecting region 44G at an angle of incidence $\theta_1$, it is reflected (represented by arrow 404*c*) towards light detecting element 18 at an angle of reflection $\theta_2$. When light emitted by light emitting element 14 is incident upon light absorbing region 44E, the light is substantially absorbed. In this manner, code scale 40 can provide multiple different types of reflective behavior, depending on which region is incident to the emitted light. While three different types of regions are shown in FIG. 4, different numbers of region types can be used depending on the implementation. As an example, code scale 40 can contain a first set of diffuse light reflection regions that diffusely reflects light in a particular pattern, and a second set of diffuse light reflection regions that diffusely reflects light in a different pattern. In another example, code scale 40 can contain a first set of specular light reflection regions that specularly reflects light at a first angle of reflection, and a second set of specular light reflection regions that specularly reflects light at a second angle of reflection. In some implementations, code scale 40 can have regions 44 that provide anisotropic reflection. As an example, code scale 40 can contain a first set of light absorbing regions and a second set of anisotropic reflective regions. Other combinations and patterns of regions may be appropriate, depending on the implementation.

In these examples, particular regions are described as light absorbing, diffusely reflective, specularly reflective, or anisotropic reflective. However, in some implementations, each region can have combinations of two or more different reflective characteristics (e.g., combinations of light absorbing and diffusely, specularly, and anisotropic reflective characteristics). For example, a region may be diffusely reflective but have a substantial specular reflectance component, or specularly reflective with a substantial diffuse reflectance component. Further, in some implementations, a diffusely reflective region can have a combination of light absorbing and diffusely, specularly, and anisotropic reflective characteristics, but predominantly exhibits diffusely reflective characteristics. Likewise, in some implementations, a specularly reflective region can have a combination of light absorbing and diffusely, specularly, and anisotropic reflective characteristics, but predominantly exhibits specularly reflective characteristics. And in a similar manner, in some implementations, an anisotropic reflective region can have a combination of light absorbing and diffusely, specularly, and anisotropic reflective characteristics, but predominantly exhibits anisotropic reflective characteristics. And in some implementations, an light absorbing region can have a combination of light absorbing and diffusely, specularly, and anisotropic reflective characteristics, but predominantly exhibits light absorbing characteristics.

Code scale 40 can be provided with different regions 44 in a variety of ways. In an example process, an elongated generalized cylinder can be coated with one or more different layers of materials having different light reflective properties. Portions of these layers can be selectively removed in order to expose a particular underlying material. A generalized cylinder can be, for example, any enclosed shape having a predominantly circular, polygonal, or arbitrary cross-section. The cross-section can be orthogonal to the longitudinal axis or parallel with any bases of the generalized cylinder.

FIGS. 5A through 5H illustrate various examples of the types of features and layers that can be provided to impart a desired pattern of optical characteristics for a code wheel. Although several example types of features are shown in FIGS. 5A through 5H, these are merely examples. An actual implementation of a code scale can have all of these features, a subset of these features, and/or multiple instances of particular features, depending on the implementation. Further, while a number of processes are shown in FIGS. 5A through 5H, a code scale can be produced using a particular sequence of steps in which one or more of these processes might be repeated, skipped, or performed in a different order, depending on the implementation.

As shown in FIG. 5A a generalized cylinder 502 can be used as a base for one or more code scales. The dimensions and shape of generalized cylinder 502 can vary, depending on the implementation. For example, generalized cylinder 502 can be selected such that its axial length spans a length at least as long as the total combined lengths of one or more desired code scales, and such that it has a suitable diameter (e.g., from 0.1 to 10 mm). In this example, generalized cylinder 502 is relatively rough, and does not substantially reflect light. However, in some implementations, generalized cylinder 502 can be less rough and may reflect light diffusely. In this example, generalized cylinder 502 is composed of a metal. However, generalized cylinder 502 can composed of one or more other materials, depending on the implementation. For example, in some implementations, generalized cylinder 502 can be brass, steel, aluminum, copper, or various plastics, selected to withstand different environments or uses. In some implementations, generalized cylinder 502 is a metal with the properties of stainless steel, brass, or aluminum. The dimensions of generalized cylinder 502 can vary depending on the implementation. For instance, depending on the implementation, the longitudinal length of generalized cylinder 502 can be greater than, equal to, or less than the diameter of the generalized cylinder. As an example, in implementations where the longitudinal length of generalized cylinder 502 is greater than a diameter of the generalized cylinder, the longitudinal length of generalized cylinder 502 can be between 10 and 4000 mm and the diameter can be between 0.1 and 10 mm.

As shown in FIG. 5B, the outer circumferential surface 43 of generalized cylinder 502 (e.g., a surface of the generalized cylinder 502 parallel to its longitudinal axis 506) is treated in order to change its reflective properties. For example, generalized cylinder 502 can be polished such that it reflects light specularly (e.g., polished to a surface roughness arithmetic mean value (Ra) less than 0.3 µm). It may be appropriate to polish generalized cylinder 502 differently, depending on the implementation. For example, in some cases, generalized cylinder 502 can be polished to a lesser extent, such that generalized cylinder 502 reflects light diffusely (e.g., polished to a surface roughness arithmetic mean value (Ra) greater than 1.6 µm). In another example, the rod may be polished to an intermediate extent, such that generalized cylinder 502 reflects light partially diffusely and partially specularly (e.g. polished to a surface roughness arithmetic mean value (Ra) between 0.3 and 1.6 µm. As another example, in some implementations, generalized cylinder 502 can be chemically treated (e.g. using a caustic or acidic agent) or physically treated (e.g., an abrasive agent) in order to roughen its surface. In some implementation, the generalized cylinder 502 can be prepared so that is it more suitable for coating. As an example, generalized cylinder 502 can be prepared by removing surface oxides to make the surface of generalized cylinder 502 less rough. Generalized cylinder 502 can be treated in a directionally dependent manner, or randomly. For example, in some implementations, generalized cylinder 502 can be polished, roughened, or otherwise treated with respect to one or more axes. In another example, generalized cylinder 502 can be treated randomly, such that it is not directly polished, roughened, or treated with respect to any particular axis or axes.

As shown in FIG. 5C, the outer circumferential surface of generalized cylinder 502 can be machined in order to provide a particular pattern of features on the surface of generalized cylinder 502. In this example, a series of grooves 504 are machined onto the surface of generalized cylinder 502 as the generalized cylinder is rotated about its longitudinal axis 506. Grooves 504 can have different dimensions and patterns in order to impart generalized cylinder 502 with different reflective characteristics. For example, a repeating pattern of grooves can be machined on the surface of generalized cylinder 502, such that each groove is normal, perpendicular, or at another angle relative to the longitudinal axis of the code scale. In this example, light incident upon the machined grooves will reflect differently than light that is not incident on the groove. The depth, width, shape and pattern of the grooves 504 can be varied to impart generalized cylinder 502 with different reflective behavior, depending on the implementation. As an example, grooves can be cut parallel to the longitudinal axis of the generalized cylinder, and the dimension of each groove and the spacing between each groove can be different. As another example, grooves can be cut both parallel and normal or at any angle relative to the longitudinal axis of the generalized cylinder. Grooves can define a convex, concave, triangular, rectangular, or other shape in cross-section. In some implementations, grooves can define a combination of two or more similar or different shapes. Grooves can repeat at some defined frequency, or can occur randomly, for example, to generate anisotropic reflective characteristics.

As shown in FIG. 5D, the outer circumferential surface of generalized cylinder 502 can be coated with a material 508 that reflects light diffusely. Diffusely reflective material 508 can be, for example, a white polyurethane paint, or a white photo-resistive material. In some implementations, diffusely reflective material 508 can be applied to the surface of generalized cylinder 502 through electroplating. Although white colored materials are provided as an example, in some implementations, diffusely reflective material 508 can be other colors, so long as it is diffusely reflective with respect to incident light of a particular wavelength or range of wavelengths. The thickness of diffusely reflective material 508 can vary, depending on the implementation. For example, in some implementations, the thickness may be between 1 and 30 μm. In some implementations, prior to coating, the surface of generalized cylinder 502 can be treated to promote adhesion between the coating material and the generalized cylinder. For example, in some implementations, the surface of generalized cylinder 502 can be degreased (e.g., with a non-polar solvent), mechanically roughened (e.g., with an abrasive), or chemically treated (e.g., with a caustic or acidic solution) so that it is better suited for coating.

As shown in FIG. 5E, the diffusely reflective material 508 can be coated with a material 510 that absorbs light. Light absorbing material 510 can be, for example, a black polyurethane paint, or a black photo-resistive material. In some implementations, diffusely reflective material 508 can be applied to the surface of generalized cylinder 502 through electroplating. While black colored materials are provided as an example, in some implementations, light absorbing material 510 can be other colors, so long as it is light absorbing with respect to incident light of a particular wavelength or range of wavelengths. The thickness of light absorbing material 510 also can vary, depending on the implementation. For example, in some implementations, the thickness may be between 1 and 30 μm.

As shown in FIG. 5F, portions of light absorbing material 510 can be removed selectively. The amount of material removed can vary, depending on the implementation. For example, as shown in FIG. 5F, a portion of light absorbing material 510 can be removed completely, creating a region 512 (e.g., a narrow slit or a wider gap) that reveals the underlying diffusely reflective material 508. In another example, a portion of light absorbing material 510 can be removed partially, leaving a portion 514 of diffusely absorbing material 510 with reduced thickness. Light absorbing material 510 can be removed in a variety of ways. For example, if light absorbing material 510 is a polyurethane paint, portions of light absorbing material 510 can be removed using a laser to ablate the paint. In an example implementation, one or more lasers can be positioned beyond the outer periphery of the light absorbing material 510, and can be activated selectively as generalized cylinder 502 is rotated. In another example, if light absorbing material 510 is a photo-resistive material, portions of light absorbing material 510 can be removed by exposing those portions to an appropriate light source (e.g., through the use of a light mask).

In some implementations, portions of both the light absorbing material 510 and the underlying diffusely reflective material 508 are removed selectively. The amount of material removed can vary, depending on the implementation. For example, as shown in FIG. 5G, a portion of light absorbing material 510 and an underlying portion of diffusely reflective material 508 are removed selectively, leaving a portion 516 of diffusely reflective material 508 with reduced thickness. In another example, as shown in FIG. 5H, a portion of light absorbing material 510 and an underlying portion of diffusely reflective material 508 are removed selectively, creating a region (e.g., a narrow slit or wider gap) 518 that reveals the underlying generalized cylinder 502 and any features machined into its surface. Diffusely reflective material 508 can be removed in a manner similar to light absorbing material 510.

After a desired pattern has been removed, the generalized cylinder and its layers are cut to form code scales. For example, as shown in FIG. 5I, the generalized cylinder and its layers are cut along multiple planes 520a-d transverse to its longitudinal axis 506, resulting in five individual code scales 40a-e. While four cuts are shown in this example, a greater or fewer number of cuts can be used, depending on the implementation.

Figure 6:
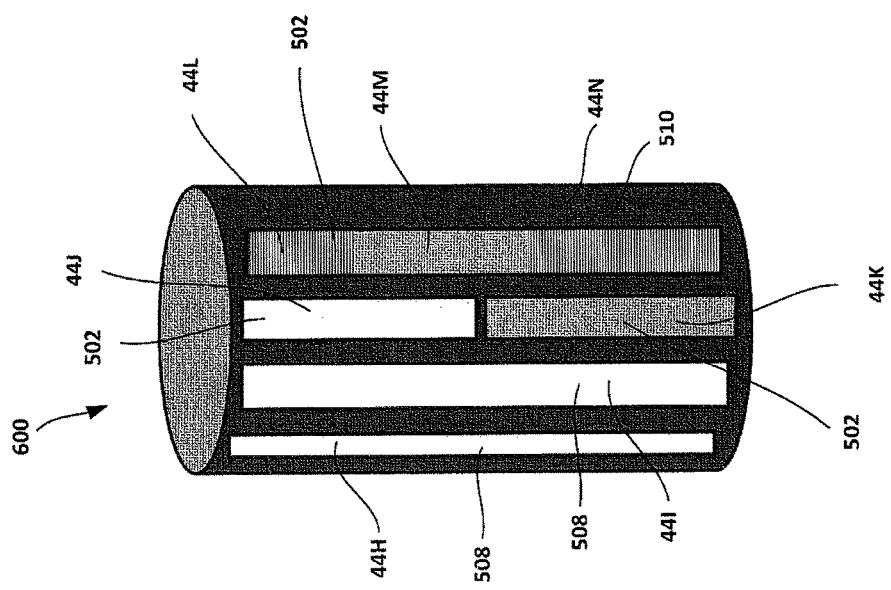
FIG. 6 shows an example code scale made using the processes shown in FIGS. 5A-I.

A code scale can be produced by performing all or only some of the processes described above in FIG. 5A though 5H. The structure 600 of FIG. 6 illustrates examples of the various features that can be included on an actual code scale. Although several example features are shown on structure 600, an actual code scale can include all of these features or a subset of these features, depending on the implementation.

Structure 600 includes several different regions 44H-N that have been created using the processes described above in FIGS. 5A through 5H. Region 44H is a diffuse light reflection region, and can be formed through the selective removal of a portion of light absorbing material 510, revealing the underlying diffusely reflective material 508.

Region 44I is a second diffuse light reflection region, and can be formed through the selective removal of a portion of light absorbing material 510 and underlying diffusely reflective material 508, leaving a portion of diffusely reflective material 508 with reduced thickness. Due to the differences in thickness of diffusely reflective material 508 at regions 44H and 44I, regions 44H and 44I each diffuse light differently.

Region 44J is a specular light reflection region, and can be formed through the selective removal of a portion of light absorbing material 510 and underlying diffusely reflective material 508, revealing the underlying generalized cylinder 502. In region 44J, the revealed portion of generalized cylinder 502 has been polished, and reflects light specularly.

Region 44K is a third diffuse light reflection region, and can be formed through the selective removal of a portion of light absorbing material 510 and underlying diffusely reflective material 508, revealing the underlying generalized cylinder 502. In region 44K, the revealed portion of generalized cylinder 502 has been polished to a lesser extent than the portion of region 44J, and reflects light diffusely, in a different manner from regions 44A-B.

Region 44L is an anisotropic light reflection region, and was formed through the selective removal of a portion of light absorbing material 510 and underlying diffusely reflective material 508, revealing the underlying generalized cylinder 502. In region 44L, the revealed portion of generalized cylinder 502 has been machined, and reflects light anisotropically. Due to the machining of the revealed portion of generalized cylinder 502, region 44L reflects light differently from region 44J.

Region 44M is a second specular light reflection region, and can be formed through the selective removal of a portion of light absorbing material 510 and underlying diffusely reflective material 508, revealing the underlying generalized cylinder 502. In region 44M, the revealed portion of generalized cylinder 502 has been machined differently from region 44L, and reflects light specularly instead of anisotropically.

Region 44N is a light absorbing region, and can be formed by preserving light absorbing material 510.

FIGS. 5 and 6 show example processes for creating structures with several different light absorbing, specular light reflection, and diffuse light reflection regions, and demonstrate how several of these regions can be provided on a single structure. However, a code scale 40 need not have the particular configuration shown in FIG. 6, and depending on the implementation, can have greater or fewer different types of regions and/or different arrangements of regions. Accordingly, one or more of the processes shown in FIG. 5A-I can be skipped, repeated, or rearranged in order to produce a code scale with the desired configuration.

For example, a code scale 40 can be produced having two specular light reflection regions 44P and 44Q that have different optical characteristics. A side view and cross-sectional view of this example code scale 40 is shown in FIGS. 7A and 7B, respectively. In this example, a generalized cylinder 502 is polished (e.g., in a manner similar to that shown in FIG. 5B), and a series of grooves 504 are machined into the generalized cylinder 502 in a direction parallel to the longitudinal axis of the generalized cylinder 506 (e.g., in a manner similar to that shown in FIG. 5C, but with a different groove direction). After machining, the generalized cylinder 502 can be polished again. The generalized cylinder 502 is then cut into different pieces, creating several code scales 40 (e.g., in a manner similar to that shown in FIG. 5I). As shown in FIG. 7C, when light (represented by arrows 702) is incident on a region 44P, the light is reflected specularly over a range of incident angles (represented by arrows 704). As shown in FIG. 7D, when light (represented by arrows 706) is incident on a region 44Q, due to the dimension of the groove 504, only light of a narrower range of incident angles is reflected specularly from region 44Q (represented by arrow 708). Thus, region 44Q also provides specular reflection, but is more restrictive than region 44P with regard to what incident angles are reflected. In this example, regions 44P and 44Q are two different sets of specular light reflection regions, each having a different specular reflection behavior. In some implementations, the dimensions of the groove (e.g., the depth) can be modified, such that light of a larger or smaller range of incident angles can escape from regions 44Q.

In the above example, the generalized cylinder 502 is polished twice. This may be beneficial in some implementations, for example to initially remove surface irregularities that might impede proper alignment of the generalized cylinder or interfere with the machining process, then to remove surface irregularities that may have been introduced during the machining process. However, in some implementations, the generalized cylinder 502 may be polished a fewer number of times (e.g., once or not at all) or a greater number of times (e.g., three, four, five, or more times), depending on the implementation.

As another example, a code scale 40 can be produced having light absorbing regions 44R and diffuse light reflection regions 44S. A side view and cross-sectional view of this example code scale 40 is shown in FIGS. 8A and 8B, respectively. In this example, a generalized cylinder 502 is polished (e.g., in a manner similar to that shown in FIG. 5B), and the generalized cylinder 502 is coated with a diffusely reflective material 508 (e.g., in a manner similar to that shown in FIG. 5D), and then coated with a light absorbing material 510 (e.g., in a manner similar to that shown in FIG. 5E). Then, portions of light absorbing material 510 are removed selectively in a direction parallel to the longitudinal axis of the generalized cylinder 506, revealing the underlying diffusely reflective material 508 (e.g., in a manner similar to that shown in FIG. 5F). The generalized cylinder 502 and its coated layers are then cut into different pieces, creating several code scales 40 (e.g., in a manner similar to that shown in FIG. SI). As shown in FIG. 8C, when light (represented by arrow 802) is incident on region 44R (corresponding on the light absorbing material 510), the light is absorbed. As shown in FIG. 8D, when light (represented by arrow 804) is incident on region 44S (corresponding on the revealed diffusely reflective material 508), the light is diffusely reflected (represented by arrows 806). Therefore, in this example, region 44R is a light absorbing region, whereas region 44S is a diffuse light reflection region.

In FIGS. 8A-8D, an example code scale 40 is shown having light absorbing regions and diffusive light reflection regions, created using a particular sequence of steps. However, a similar code scale 40 can be produced using other combinations of steps. For instance, in an alternative process, a generalized cylinder 502 is roughened (e.g., in a manner similar to that shown in FIG. 5B), such that it diffusely reflects light. The generalized cylinder 502 then is coated with a light absorbing material 510 (e.g., in a manner similar to that shown in FIG. 5E). Next, portions of light absorbing material 510 are removed selectively, revealing the underlying roughened generalized cylinder 502 (e.g., in a manner similar to that shown in FIG. 5F). The generalized cylinder 502 and its coated layer is then cut into different pieces, creating several code scales 40 (e.g., in a manner similar to that shown in FIG. 5I). Thus, when light is incident on a region corresponding to the light absorbing material 510, the light is absorbed. And when light is incident on a region corresponding to the revealed roughened generalized cylinder 502, the light is diffusely reflected. The foregoing description illustrates just one example of how similar code scales 40 can be created using different combinations and sequences of the steps described above. Other combinations and sequences of steps can be used to create similar or different code scales 40.

As another example, a code scale 40 can be produced having light absorbing regions 44T and specular light reflection regions 44U. A side view and cross-sectional view of this example code scale 40 is shown in FIGS. 9A and 9B, respectively. In this example, a generalized cylinder 502 is polished (e.g., in a manner similar to that shown in FIG. 5B), and the generalized cylinder 502 is coated with a light absorbing material 510 (e.g., in a manner similar to that shown in FIG. 5E). Then, portions of light absorbing material 510 are removed selectively in a direction parallel to the longitudinal axis of the generalized cylinder 506, revealing the underlying polished generalized cylinder 502 (e.g., in a manner similar to that shown in FIG. 5F). The generalized cylinder 502 and its coated layers are then cut into different pieces, creating several code scales 40 (e.g., in a manner similar to that shown in FIG. 5I). As shown in FIG. 9C, when light (represented by arrow 902) is incident on region 44T (corresponding on the light absorbing material 510), the light is absorbed. As shown in FIG. 9D, when light (represented by arrow 904) is incident on region 44U (corresponding on the revealed polished generalized cylinder 502), the light is reflected specularly (represented by arrow 906). Therefore, in this example, region 44T is a light absorbing region, whereas region 44U is a specular light reflection region.

Figure 10D:
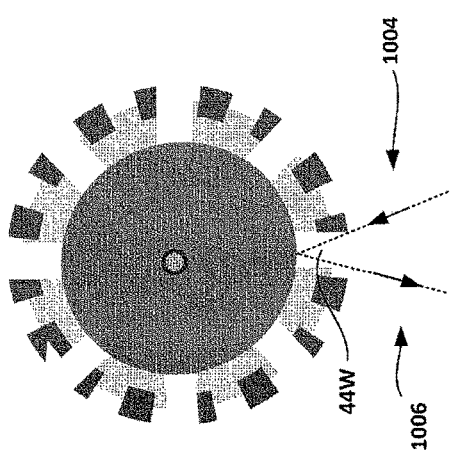
Figure 10E:
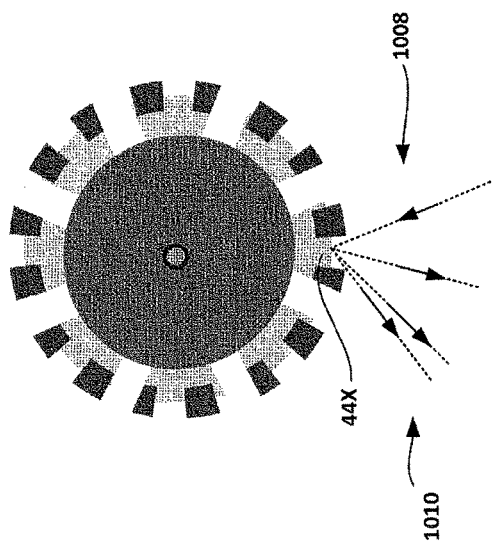
Figure 10C:
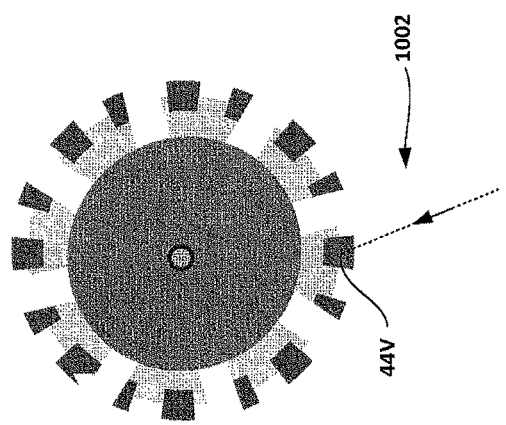

As another example, a code scale 40 can be produced having light absorbing regions 44V, specular light reflection regions 44W, and diffuse light reflection regions 44X. A side view and cross-sectional view of such a code scale 40 are shown in FIGS. 10A and 10B, respectively. In this example, a generalized cylinder 502 is polished (e.g., in a manner similar to that shown in FIG. 5B), and the generalized cylinder 502 is coated with a diffusely reflective material 508 (e.g., in a manner similar to that shown in FIG. 5D), and then coated with a light absorbing material 510 (e.g., in a manner similar to that shown in FIG. 5E). Then, portions of light absorbing material 510 are removed selectively in a direction parallel to the longitudinal axis of the generalized cylinder 506, revealing the underlying polished generalized cylinder 502 (e.g., in a manner similar to that shown in FIG. 5F), and portions of both the light absorbing material 510 and the diffusely reflective material 508 are removed selectively in a direction parallel to the longitudinal axis of the generalized cylinder 506, revealing the underlying polished generalized cylinder 502 (e.g., in a manner similar to that shown in FIG. 5H). The generalized cylinder 502 and its coated layers then are cut into different pieces, creating several code scales 40 (e.g., in a manner similar to that shown in FIG. 5I). As shown in FIG. 10C, when light (represented by arrow 1002) is incident on region 44V (corresponding on the light absorbing material 510), the light is absorbed. As shown in FIG. 10D, when light (represented by arrow 1004) is incident on region 44W (corresponding on the revealed polished generalized cylinder 502), the light is specularly reflected (represented by arrow 1006). As shown in FIG. 10E, when light (represented by arrow 1008) is incident on region 44X (corresponding on the revealed diffusely reflective material 508), the light is diffusely reflected (represented by arrows 1010). Therefore, in this example, region 44V is a light absorbing region, region 44W is a specular light reflection region, and region 44X is a diffuse light reflection region Although several code scales are described above, these are only examples. Other code scales having greater or fewer different types of regions and/or different arrangements of regions may be appropriate, depending on the implementation. Further, although several example code scales are illustrated in the figures, these figures are not necessarily drawn to scale. Certain features may be exaggerated, moved, or otherwise altered in order to accentuate particular aspects.

Likewise, although several sequences of steps for producing code scales are described above, these are only examples. Other sequences or combinations of steps may be appropriate, depending on the implementation.

While several example features are described as being on the generalized cylinder of a code scale, features that are on the generalized cylinder may be in direct contact with the generalized cylinder, or there may be an intervening layer of other feature, depending on the implementation.

Although various cylindrical-shaped code scales are described above, code scales are not limited to these example arrangements. For example, in some implementations, code scales can have one or more optical encoding regions on its circular base, instead of on its circumferential periphery. In these embodiments, the code scales may be positioned such that light emitted by the optical encoder module is incident on its circular base, instead of on its circumferential periphery. Code scales having this arrangement also can be made in a manner similar to that described above.

Figure 11D:
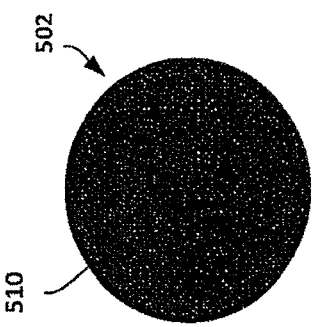
FIGS. 11A-F show another example process of making a code scale.
Figure 11C:
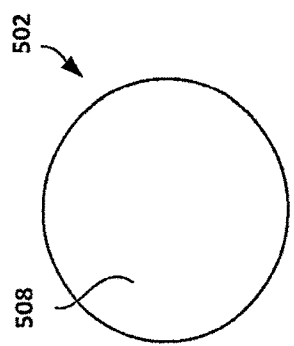
Figure 11B:
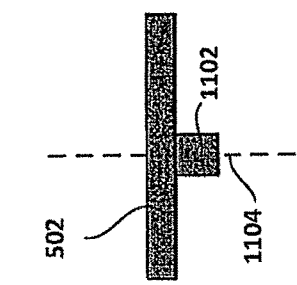
Figure 11A:
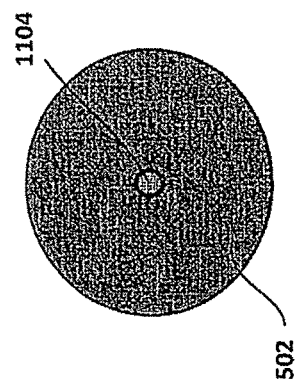
Figure 11F:
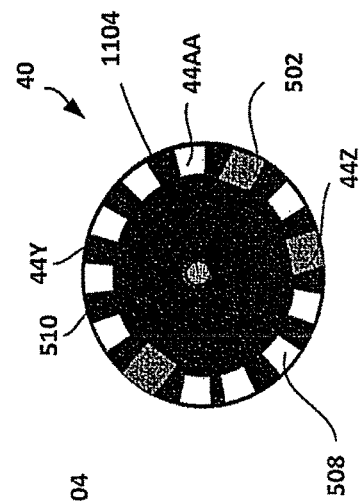
Figure 11E:
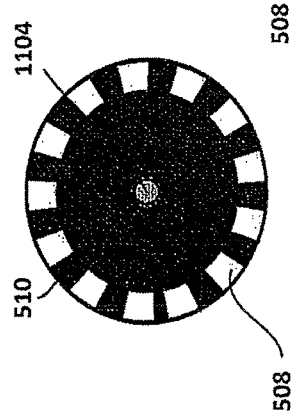

For example, FIGS. 11A and 11B show a side view and cross-sectional view, respectively, of an example generalized cylinder 502 having disc-like dimensions (e.g., a generalized cylinder having a longitudinal length less than its diameter). In this example, generalized cylinder 502 also includes a small spacing element 1102 positioned along the longitudinal axis 1104 of generalized cylinder 502. However, spacing element 1102 need not be included, depending the implementation. In this example, as shown in FIG. 11C, generalized cylinder 502 is coated with a diffusely reflective material 508 (e.g., in a manner similar to that shown in FIG. 5D), and as shown in FIG. 11D, is coated with a light absorbing material 510 (e.g., in a manner similar to that shown in FIG. 5E). Then, as shown in FIG. 11E, portions of light absorbing material 510 are removed selectively in a circular direction about the longitudinal axis 1104 of the generalized cylinder 502, revealing the underlying diffusely reflective material 508 (e.g., in a manner similar to that shown in FIG. 5F), and as shown in FIG. 11F, portions of both the light absorbing material 510 and the diffusely reflective material 508 are removed in a circular direction about the generalized cylinder's longitudinal axis 1104, revealing the underlying polished generalized cylinder 502 (e.g., in a manner similar to that shown in FIG. 5H). This results in a code scale 40 with light absorbing regions 44Y, specular light reflection regions 44Z and diffuse light reflection regions 44AA. FIGS. 11A-F illustrate just one example process of producing a code scales having one or more optical encoding regions on its circular base, instead of on its circumferential periphery. Other sequences or combinations of steps may be appropriate, depending on the implementation.

In the above examples, a "generalized cylinder" refers to an object that is generally bounded by a closed generalized cylinder. Although generalized cylinders are shown having circular cross sections in the examples above (e.g., generalized cylinder 502), in some implementations, generalized cylinder 502 can have differently shaped cross sections. For example, generalized cylinder 502 can have an ovular, elliptical, triangular, square, rectangular, pentagonal, or other polygonal cross section, depending on the implementation. In another example, generalized cylinder 502 can have an arbitrary cross section (e.g., a free form cross section). Further, although generalized cylinder 502 is shown having a uniform cross section between its bases in the examples above, in some implementations, generalized cylinder 502 can be non-uniform, and can vary in cross section between its bases. For example, in some implementations, the center of generalized cylinder 502 can have a larger cross section than the ends of generalized cylinder 502. In another example, the center of generalized cylinder 502 can have a smaller cross section than the ends of generalized cylinder 502. In another example, the center of generalized cylinder 502 can have a first cross sectional shape, and the ends of generalized cylinder 502 can have different cross sectional shapes. Generalized cylinder 502 can have other combinations of cross sectional sizes and shapes, depending on the implementation.

Further, although the above examples show code scales having features that generally extend longitudinally between the bases of the generalized cylinder, the pattern of features can vary, depending on the implementation. For example, features can extend parallel between the two bases, or according to a particular angle relative to the longitudinal axis of the code scale. In some implementations, features can vary in size and shape. In some implementations, features can be distributed according to a localized pattern (e.g., having a higher concentration of features in a particular portion of a code scale relative to another portion). In some implementations, features can be distributed according to a periodic pattern (e.g., having features that are evenly spaced). In some implementations, features can be distributed according to an arbitrary pattern, and need not have a specific repeating pattern. In some implementations, features can be distributed according to a combination of patterns (e.g., having a global pattern that defines the general location and shape of features, and a localized pattern that defines specific features within particular portions of the code scale). A code scale can have other patterns or combinations of patterns, depending on the implementation.

Although particular examples are described above, various modifications can be made. Thus, other implementations are within the scope of the claims.

What is claimed is:

1. A code scale for an optical encoder system, comprising:
  a cylinder having a first circumferential surface, the first circumferential surface having a first light reflective characteristic;
  a first layer at least partially coating the first circumferential surface, the first layer having a second circumferential surface;
  a second layer at least partially coating the second circumferential surface, the second layer having a third circumferential surface;
  one or more first gaps extending through the second layer to the second circumferential surface; and
  one or more second gaps extending through the second layer and the first layer to the first circumferential surface,
  wherein the second circumferential surface has a second light reflective characteristic different from a first light reflective characteristic, and
  wherein the third circumferential surface has a third light reflective characteristic different from the first light reflective characteristic and the second light reflective characteristic.

2. The code scale of claim 1, wherein the first and second reflective characteristics each correspond to different specularly reflective characteristics.

3. The code scale of claim 1, wherein one of the first and second reflective characteristics corresponds to a predominantly anisotropic reflective characteristic.

4. The code scale of claim 1, wherein one of the first and second reflective characteristics corresponds to a predominantly diffusely reflective characteristic.

5. The code scale of claim 1, wherein each of at least two of the first, second, and third reflective characteristics corresponds to a different respective specularly reflective characteristic.

6. The code scale of claim 1, wherein the at least two of the first, second, and third reflective characteristics corresponds to a predominantly anisotropic reflective characteristic.

7. The code scale of claim of claim 1, wherein at least one of the first, second, and third reflective characteristics corresponds to a predominantly diffusely reflective characteristic.

8. The code scale of claim 1, where at least one of the first, second, and third reflective characteristics corresponds to a predominantly light absorbing characteristic.

9. The code scale of claim 1, wherein at least one of the first and second reflective characteristic corresponds to a predominantly light absorbing characteristic.

10. The code scale of claim 1, wherein the first circumferential surface is a polished surface.

11. The code scale of claim 10, wherein the first circumferential surface defines one or more grooves.

12. The code scale of claim 10, wherein the second circumferential surface comprises a first material, the first material being diffusely reflective with respect to incident light of a wavelength or a range of wavelengths.

13. The code scale of claim 12, wherein the first material comprises at least one of a white polyurethane paint or a white photo-resistive material.

14. The code scale of claim 12, wherein the third circumferential surface comprises a second material, the second material being light absorptive with respect to incident light of the wavelength or the range of wavelengths.

15. The code scale of claim 14, wherein the second material comprises at least one of a black polyurethane paint or a black photo-resistive material.

* * * * *